United States Patent
Sato et al.

(10) Patent No.: US 10,213,741 B2
(45) Date of Patent: Feb. 26, 2019

(54) EXHAUST GAS PURIFICATION CATALYST FOR INTERNAL COMBUSTION ENGINE

(71) Applicant: Mitsubishi Jidosha Kogyo Kabushiki Kaisha, Tokyo (JP)

(72) Inventors: Ryosuke Sato, Tokyo (JP); Kinichi Iwachido, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/471,113

(22) Filed: Mar. 28, 2017

(65) Prior Publication Data

US 2017/0312690 A1    Nov. 2, 2017

(30) Foreign Application Priority Data

May 2, 2016    (JP) .................................. 2016-092555

(51) Int. Cl.
  *B01J 23/00*    (2006.01)
  *B01D 53/94*    (2006.01)
  (Continued)

(52) U.S. Cl.
  CPC ......... *B01D 53/945* (2013.01); *B01D 53/944* (2013.01); *B01D 53/9445* (2013.01);
  (Continued)

(58) Field of Classification Search
  CPC .......... B01D 53/945; B01D 2255/9022; B01D 2255/908; B01D 2255/1025;
  (Continued)

(56) References Cited

U.S. PATENT DOCUMENTS

2009/0041643 A1*    2/2009    Deeba ................ B01D 53/9445
                                                      423/213.5
2013/0310248 A1    11/2013    Aoki et al.
2016/0199815 A1    7/2016    Hoshino et al.

FOREIGN PATENT DOCUMENTS

EP    2 781 261 A1    9/2014
JP    5287884-82    9/2013
(Continued)

OTHER PUBLICATIONS

Extended European Search Report effective Sep. 22, 2017 issued to the corresponding EP Application No. 17163077.5.

*Primary Examiner* — Haytham Soliman
(74) *Attorney, Agent, or Firm* — Birch, Stewart, Kolasch & Birch, LLP

(57) ABSTRACT

An object of at least one embodiment of the present invention is to suppress poisoning due to phosphorus derived from engine oil, and effectively purify NOx discharged from the time of engine start up to a high load condition. In an exhaust gas purification catalyst for an internal combustion engine, a catalyst layer includes: a first catalyst layer exposed to an exhaust gas flow; and a second catalyst layer formed between the first catalyst layer and the substrate. A second catalyst upstream layer formed on an upstream side of the second catalyst layer with respect to the exhaust gas flow and a first catalyst downstream layer formed on a downstream side of the first catalyst layer with respect to the exhaust gas flow include at least one of palladium and platinum, as well as an oxygen storage material as the catalyst component. An amount of the oxygen storage material in the first catalyst downstream layer is larger than an amount of the oxygen storage material in the second catalyst upstream layer.

7 Claims, 6 Drawing Sheets

(51) Int. Cl.
  *B01J 23/42* (2006.01)
  *B01J 23/44* (2006.01)
  *B01J 23/46* (2006.01)
  *B01J 35/04* (2006.01)
  *F01N 3/10* (2006.01)
  *B01J 37/02* (2006.01)
  *B01J 35/00* (2006.01)
  *B01J 23/63* (2006.01)

(52) U.S. Cl.
  CPC ............ *B01J 23/002* (2013.01); *B01J 23/42* (2013.01); *B01J 23/44* (2013.01); *B01J 23/464* (2013.01); *B01J 23/63* (2013.01); *B01J 35/0006* (2013.01); *B01J 35/04* (2013.01); *B01J 37/0244* (2013.01); *F01N 3/101* (2013.01); *B01D 2255/1021* (2013.01); *B01D 2255/1023* (2013.01); *B01D 2255/1025* (2013.01); *B01D 2255/407* (2013.01); *B01D 2255/908* (2013.01); *B01D 2255/9022* (2013.01); *B01D 2255/9032* (2013.01); *B01D 2258/012* (2013.01); *F01N 2510/0684* (2013.01)

(58) Field of Classification Search
  CPC .... B01D 2255/1023; B01D 2255/1021; F01N 3/101; F01N 2510/0684; B01J 35/04; B01J 23/464; B01J 23/44; B01J 23/42
  USPC ........................................................ 502/325
  See application file for complete search history.

(56) References Cited

FOREIGN PATENT DOCUMENTS

JP       2015-24381 A       2/2015
WO    WO 2015/087871 A1    6/2015

\* cited by examiner

FIG. 3A     FIG. 3B
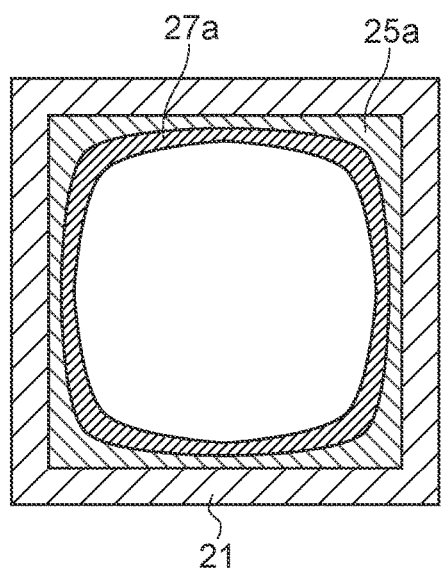
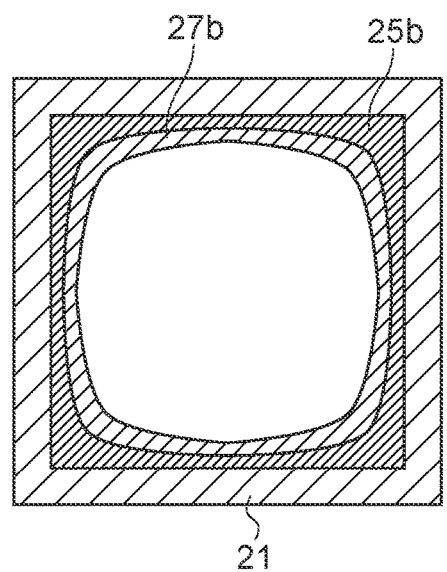
FIG. 4A     FIG. 4B     FIG. 4C
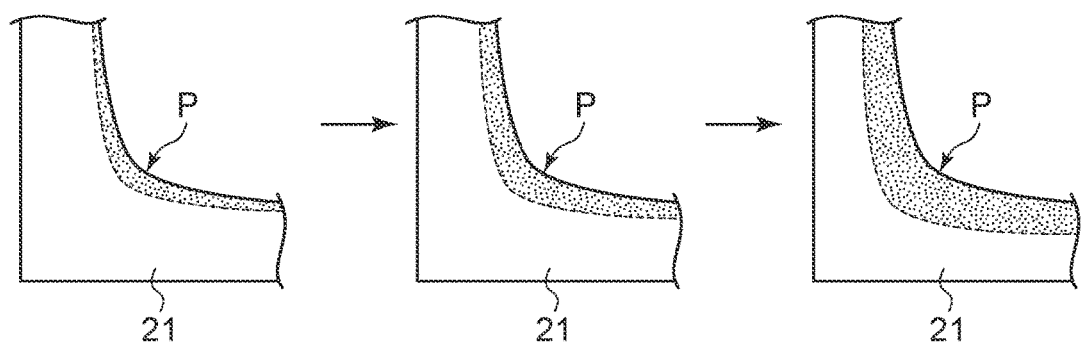

FIG. 6

| COMPARATIVE EXAMPLE 1 | COMPARATIVE EXAMPLE 2 |
|---|---|
| 125, 127, 21, L<br>CATALYST LAYER127 : Rh 0.85g/L<br>CATALYST LAYER125 : Pd 4.75g/L | 135a, 137, 135b, 1/2L, 21<br>CATALYST LAYER137 : Rh 0.85g/L<br>CATALYST LAYER135a : Pd 7.60g/L<br>CATALYST LAYER135b : Pd 1.90g/L |
| EXAMPLE 1 | EXAMPLE 2 |
| 25a, 27a, 31, 27b, 1/2L, 21, 25b<br>CATALYST LAYER27a,25b : Rh 0.85g/L<br>CATALYST LAYER25a : Pd 7.60g/L<br>CATALYST LAYER27b : Pd 1.90g/L | 35a, 37a, 37b, 1/2L, 35b<br>CATALYST LAYER37a : Rh 0.85g/L<br>CATALYST LAYER37b : Pd 1.90g/L<br>CATALYST LAYER35a : Pd 7.60g/L<br>CATALYST LAYER35b : Rh 0.85g/L |

(TOTAL AMOUNT OF SUPPORTED Pd, Rh IS SAME AMONG ALL COMPARATIVE EXAMPLES 1 AND 2 AND EXAMPLES 1 AND 2)

EXHAUST GAS PURIFICATION CATALYST FOR INTERNAL COMBUSTION ENGINE

CROSS REFERENCE TO RELATED APPLICATION

The present application claims priority to Japanese Patent Application No. 2016-092555 filed on May 2, 2016, the entire contents of which are incorporated by reference herein.

TECHNICAL FIELD

The present invention relates to an exhaust gas purification catalyst for an internal combustion engine.

BACKGROUND

A purification catalyst used for exhaust gas discharged from a gasoline engine includes a three way catalyst that achieves oxidation and reduction of carbon oxide (CO), hydrocarbon (HC), and nitrogen oxide (NOx) at the same time. The three way catalyst mainly includes platinum (Pt), palladium (Pd), and rhodium (Rh) as catalyst metals. Various types of such a catalyst have been proposed including: a catalyst in which the three types of catalyst metals are mixed in a single catalyst layer; a catalyst in which the catalyst layers as upper and lower layers are provided and the catalyst metals are separately supported by the layers; and a catalyst divided into an upstream side section and a downstream side section, in an exhaust gas flow direction, with the catalyst metals separately supported by the sections.

For example, Japanese Patent Application Lain-open No. 2015-24381 discloses an exhaust gas purification catalyst that is capable of efficiently purifying exhaust gas including saturated hydrocarbon and includes: a catalyst layer including only Pt as the catalyst metal on the upstream side in the exhaust gas flow direction; and a catalyst layer including Pd and Rh but including no Pt on the downstream side in the exhaust gas flow direction. In the catalyst layer including only Pt, a center portion includes a larger amount of Pt than a circumference edge portion.

Japanese Patent No. 5287884 discloses an exhaust gas purification catalyst that can suppress grain growth of a catalyst metal and includes: a substrate; a lower catalyst layer that is formed on the substrate and includes at least one of Pd and Pt; and an upper catalyst layer that includes Rh. An area including no upper catalyst layer is provided on the upstream side in the exhaust gas flow direction. The lower catalyst layer includes an upstream stage lower catalyst layer on the upstream side in the exhaust gas flow direction and a downstream stage lower catalyst layer on the exhaust gas flow direction. The upstream stage lower catalyst layer includes an oxygen absorbing and releasing material.

SUMMARY

Due to raising concern toward air pollution, a catalyst system in a gasoline engine has been required to have an improved exhaust gas purification performance. In particular, considering the environment, reduction of the exhaust gas components emitted under a cold condition is an imminent issue. In view of this, a system with the three way catalyst installed close to the engine to have a temperature swiftly risen has been developed. Such a system with catalyst installed close to the engine, however, may cause degradation of an engine performance due to a rise in exhaust gas pressure. This further raises a demand for the improvement of the catalyst performance to suppress a pressure loss of the catalyst and to conform to a stricter exhaust gas regulation. Generally, a higher exhaust gas purification performance can be achieved with a higher density of supported precious metals and with a higher catalyst temperature, as illustrated in FIG. 9. Logically, a catalyst with a larger amount of precious metal, as a catalyst active component, can achieve a higher exhaust gas purification efficiency, but requires an extremely high cost.

The system with a catalyst installed at a position close to the engine is susceptible to catalyst poisoning by phosphorus that is derived from engine oil. Precious metals and an oxygen storage capacity material (hereinafter, referred to as an OSC material), as components of the three way catalyst, are especially likely to be affected. When a poisoning component such as phosphorus accumulates on a catalyst layer, gas diffusivity in the catalyst layer degrades and thus the reactivity between the precious metal and the exhaust gas may be compromised. When phosphorus attaches to the OSC material, the initial structure of the OSC material changes, and thus the expected function cannot be exerted. The OSC material is an oxide composed of ceria-zirconia ($CeO_2$—$ZrO_2$) and a rare-earth element. When the amount of phosphorous accumulated in the catalyst layer increases, phosphorus is combined with cerium in the OSC material, whereby cerium phosphate ($CePO_4$) is formed. Thus, the $CeO_2$—$ZrO_2$ structure of the OSC material is ruined, and thus the original oxygen storage performance is largely compromised. All things, considered, the phosphorus poisoning largely affects the deterioration of the OSC material. The OSC material has a function of storing an excessive amount of oxygen when atmosphere (oxygen concentration) changes to maintain the NOx reduction performance. Thus, the phosphorus poisoning proceeds, the function of the OSC material degrades, and the NOx purification performance is compromised.

Above mentioned Japanese Patent Application Lain-open No. 2015-24381 and Japanese Patent No. 5287884 describe an exhaust gas catalyst in which a plurality individual catalyst layers are coated on a substrate, but do not disclose a technique of preventing the influence of the poisoning due to phosphorous derived from engine oil. Under a current situation where placing the catalyst closer to the engine is considered in order to achieve higher temperature rise of the catalyst in an attempt to effectively purify exhaust gas when an engine is under cold condition, it will become more important to suppress the rise in exhaust gas pressure and reduce a catalyst cost by reducing the amount of precious metal supported on the catalyst as much as possible.

In view of the technical task described above, an object of at least one embodiment of the present invention is to provide an exhaust gas purification catalyst for an internal combustion engine in which influence of poisoning by phosphorus, zinc, calcium, and the like derived from engine oil is suppressed, while an exhaust gas component (NOx in particular) discharged from engine is effectively purified.

An exhaust gas purification catalyst for an internal combustion engine according to at least one embodiment of the present invention is disposed in an exhaust gas passage of the engine and includes: a substrate; a catalyst layer formed on a surface of the substrate; and a catalyst component supported on the catalyst layer. The catalyst layer includes: a first catalyst layer exposed to an exhaust gas flow; and a second catalyst layer formed between the first catalyst layer and the substrate. A second catalyst upstream layer formed on an upstream side of the second catalyst layer with respect to the exhaust gas flow includes at least one of palladium (Pd) and platinum (Pt), as well as an oxygen storage material as the catalyst component. A first catalyst downstream layer formed on a downstream side of the first catalyst layer with respect to the exhaust gas flow includes at least one of Pd and Pt, as well as an oxygen storage material as the catalyst component. An amount of the oxygen storage material in the first catalyst downstream layer is larger than an amount of the oxygen storage material in the second catalyst upstream layer.

In the configuration described above, the amount (weight) of the OSC material in the first catalyst downstream layer is set to be larger than that in the second catalyst upstream layer. Thus, the phosphorous poisoning can be suppressed, and the exhaust gas purification performance can be improved.

The phosphorus gradually accumulates from the upstream side to the downstream side of the catalyst, and from the upper layer to the lower layer (FIGS. 4A to 4C and FIG. 5). Thus, in the embodiment described above, the OSC material and Pd that are susceptive to phosphorous poisoning are supported in the second catalyst upstream layer and the first catalyst downstream layer, and the amount of the OSC material (or the contained density of the OSC material) in the first catalyst downstream layer is set to be larger than that in the second catalyst upstream layer. By employing such configuration, the phosphorous poisoning can be suppressed, and the exhaust gas purification performance can be improved.

BRIEF DESCRIPTION OF DRAWINGS

FIG. 3A is an enlarged cross-sectional view taken along line A-A in FIG. 2, and FIG. 3B is an enlarged cross-sectional view taken along line B-B in FIG. 2;

FIGS. 4A to 4C are diagrams illustrating how the accumulation of phosphorus in the catalyst layer over time, and illustrate change over time from FIG. 4A to FIG. 4C;

FIG. 6 is a diagram illustrating a supported density and a supported length of a catalyst component in Example and Comparative Example;

DETAILED DESCRIPTION

Figure 1:
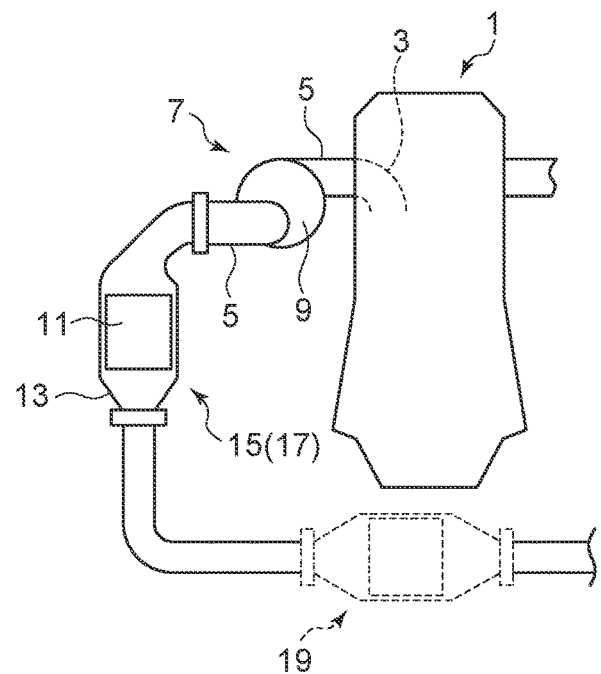
FIG. 1 is a schematic configuration view of an exhaust gas purification system including an exhaust gas purification catalyst for an internal combustion engine, as one embodiment of the present invention.

The following describes some embodiments of the present invention with reference to the accompanying drawings. It should be noted that the sizes, materials, shapes, relative arrangement, and the like of the components described as embodiments or illustrated in the drawings are given by way of example and not intended to limit the scope of the present invention. As used herein, for example, expressions representing relative or absolute arrangement, including "in a direction", "along a direction", and "center", not only represent exactly what they mean but also include states relatively displaced with a tolerance or by an angle or distance that is small enough to provide the same level of functionality. As used herein, for example, expressions meaning that things are in identical states, including "the same", "identical", and "homogeneous", not only represent exactly identical states but also include states with a tolerance or a difference that is small enough to provide the same level of functionality. As used herein, for example, expressions representing shapes, such as quadrangles and cylinders, not only represent geometrically exact quadrangles, cylinders, or the like but also represent shapes including irregularities or champers that can exhibit the same level of effects. Furthermore, the expressions of "including", "comprising", and "having" one component as used herein do not exclude other components.

FIG. 1 is a schematic configuration view of an exhaust gas purification system including an exhaust gas purification catalyst for an internal combustion engine according to one embodiment of the present invention. As illustrated in FIG. 1, an exhaust gas port 3, in communication with a combustion chamber (not illustrated) of an internal combustion engine (an example of which includes a gasoline engine) 1, is formed for each cylinder. An exhaust pipe (exhaust passage) 5 is connected to the engine 1 in such a manner as to be in communication with a corresponding one of the exhaust gas ports 3. An exhaust gas turbocharger 7 is provided on a downstream side of the exhaust pipe 5 in an exhaust gas flow direction. The exhaust gas turbocharger 7, with a turbine housing 9 in communication with the exhaust pipe 5, compresses intake air sucked in with an energy of exhaust gas e discharged from the engine 1, and supplies the resultant air to the combustion chamber of the engine 1. The exhaust pipe 5 is provided with a catalyst device 15 with an exhaust gas purification catalyst 11 incorporated in a cylindrical casing 13.

In this example, the catalyst device 15 is provided as an upstream stage three way catalyst 17 provided immediately on the downstream side of the exhaust gas turbocharger 7. The exhaust gas purification system illustrates uses the upstream stage three way catalyst 17 only. A downstream stage three way catalyst 19 may be further provided on the downstream side, that is, below a vehicle floor for example. Thus, an exhaust gas purification system with a catalyst including both the upstream stage three way catalyst 17 and the downstream stage three way catalyst 19 may be employed.

Figure 2:
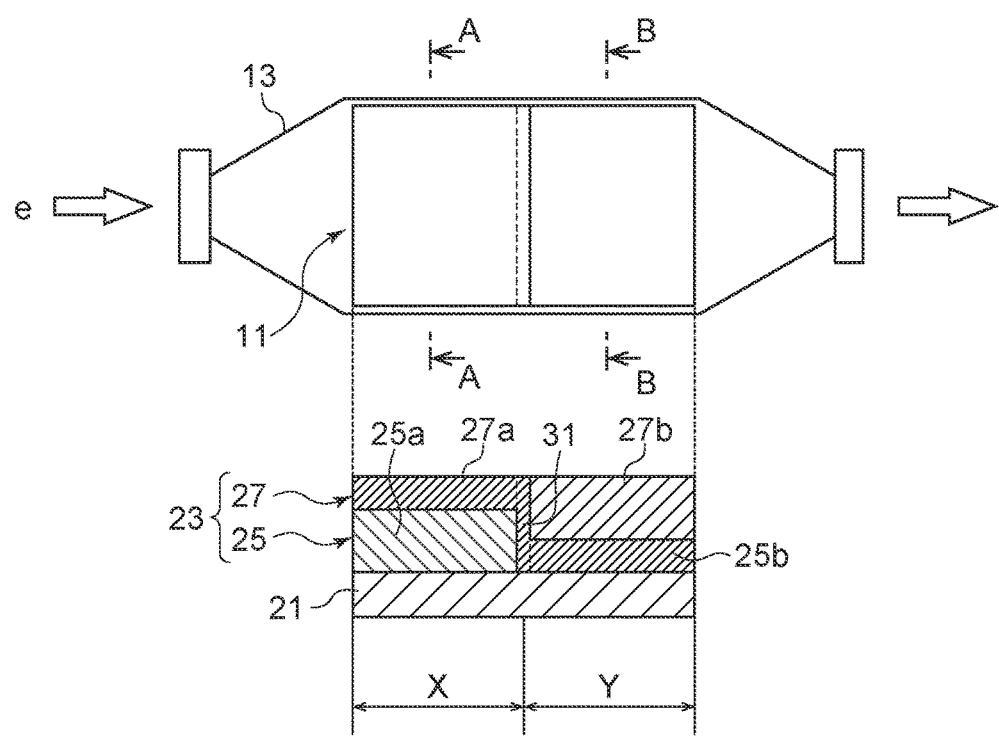
FIG. 2 is a schematic configuration view of an exhaust gas purification device for the internal combustion engine according to one embodiment of the present invention.
Figure 5:
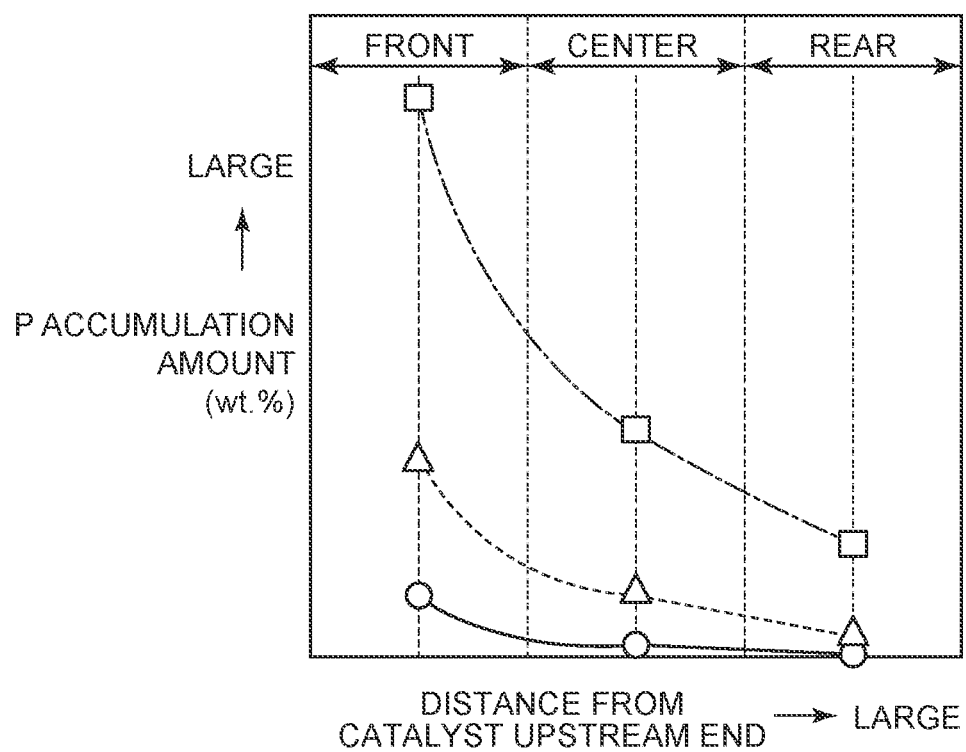
FIG. 5 is a diagram illustrating how the concentration of phosphorus accumulated in the catalyst layer changes from an upstream side the substrate to a downstream of the substrate.

As illustrated in FIG. 2, the exhaust gas purification catalyst 11 includes: a supporting substrate 21; a catalyst layer 23 formed on a surface of the supporting substrate 21; and a catalyst component (not illustrated) supported on the catalyst layer 23.

In an embodiment illustrated in FIG. 2, the supporting substrate 21 has a honeycomb structure (with cells generally having a rectangular cross-sectional shape) an example of which includes a honeycomb structure formed of cordierite or metallic foil. The supporting substrate 21 includes a single supporting substrate. The catalyst layer 23 includes: a first catalyst layer 27 which is exposed to an exhaust gas flow; and a second catalyst layer 25 which is formed between the first catalyst layer 27 and the supporting substrate 21. As illustrated in FIG. 3A, in each of the cells of the honeycomb structure of the supporting substrate 21, a second catalyst layer 25 (25a) is formed on the supporting substrate 21 and a first catalyst layer 27 (27a) is further formed on the second catalyst layer 25. The exhaust gas flows on the inner side of the first catalyst layer 27 with a hollow structure, and thus it makes contact with the first catalyst layer 27.

A second catalyst upstream layer 25a formed on the upstream side (or upstream end portion side) of the second catalyst layer 25 includes Pd and the OSC material as the catalyst active component. A first catalyst upstream layer 27a formed on the upstream side (or upstream end portion side) of the first catalyst layer 27 includes Rh as the catalyst component. Specifically, as illustrated in FIG. 2, the second catalyst upstream layer 25a corresponds to a portion in an upstream side range X of the second catalyst layer 25. The first catalyst upstream layer 27a corresponds to a portion in the upstream side range X in the first catalyst layer 27. In the present embodiment, the range X and the range Y each has a length that is ½ of the length of the supporting substrate 21 in the axial direction. The second catalyst downstream layer 25b formed on the downstream side (or downstream end portion side) of the second catalyst layer 25 includes Rh as the catalyst component. The first catalyst downstream layer 27b formed on the downstream side (or downstream end portion side) of the first catalyst layer 27 includes Pd and the OSC material as the catalyst component. Specifically, as illustrated in FIG. 2, the second catalyst downstream layer 25b corresponds to a portion in a downstream side range Y in the second catalyst layer 25. The first catalyst downstream layer 27b corresponds to a portion in a downstream side range Y in the first catalyst layer 27. The contained density of the OSC material (i.e. weight of the OSC material per unit volume) in the first catalyst downstream layer 27b is set to be higher than that in the second catalyst upstream layer 25a. That is, depending on the volumes of the first catalyst downstream layer 27b and the second catalyst upstream layer 25a, the amount of the OSC material in the first catalyst downstream layer 27b is set to be larger than the amount of the OSC material in the second catalyst upstream layer 25a. Note that Pd supported on the second catalyst upstream layer 25a and the first catalyst downstream layer 27b may be partially or entirely replaced with Pt.

FIGS. 3A and 3B are cross-sectional views illustrating a stacked state of the supporting substrate 21, the first catalyst layer 27, and the second catalyst layer 25. FIG. 3A illustrates a stacked state on the upstream end portion side of the supporting substrate 21. FIG. 3B illustrates a stacked state on the downstream end portion side of the supporting substrate 21. FIG. 3A is a partially enlarged cross-sectional view of the supporting substrate 21, taken along line A-A, and illustrates a cross-section of a single cell of a honeycomb structure. FIG. 3B is a similar cross-sectional view of the supporting substrate 21 taken along line B-B.

For example, the first catalyst layer 27 and the second catalyst layer 25 include Rh of 0.1 to 3.0 g per liter volume of the supporting substrate 21, and include Pd or Pt of 1 to 15 g per liter volume of the supporting substrate 21. For example, the OSC material includes composite oxide with $CeO_2$ or $CeO_2$—$ZrO_2$ as a main component. The OSC material of 1 to 100 g per liter volume of the supporting substrate 21 is further included. In the first catalyst layer 27 and the second catalyst layer 25 precious metal as the catalyst component is supported on an oxide base material including at least one of alumina ($Al_2O_3$), zirconia ($ZrO_2$), titania ($TiO_2$), and ceria ($CeO_2$) as a main component, and the OSC material is added.

In such an embodiment, the catalyst component supported on the second catalyst upstream layer 25a includes Pd and the OSC material. Similarly, the catalyst component supported on the first catalyst downstream layer 27b includes Pd and the OSC material. The contained density of the OSC material supported on the first catalyst downstream layer 27b is set to be higher than the contained density of the OSC material supported on the second catalyst upstream layer 25a. Thus, the phosphorous poisoning can be suppressed, and the exhaust gas purification performance can be improved.

Phosphorus gradually accumulates from the upstream side to the downstream side of the catalyst, and from an upper layer to a lower layer (FIGS. 4A to 4C and FIG. 5). As illustrated in FIGS. 4A to 4C, the accumulation gradually proceeds from the surface to an inner portion of the catalyst layer 23. As illustrates in FIG. 5, the accumulation gradually proceeds from the upstream side to the downstream side of the exhaust gas purification catalyst 11. A plurality of lines in a graph illustrated in FIG. 5 indicate a difference in accumulation of phosphorus due to a difference in a durability test condition (for example, the phosphorus concentration in engine oil). Thus, a downstream side on the lower layer side can be regarded as the portion least susceptible to the phosphorus poisoning. Still, the OSC material disposed on the lower layer side is less exposed to the exhaust gas, and thus the oxygen storage function thereof cannot be easily exhibited.

Thus, the second catalyst upstream layer 25a and the first catalyst downstream layer 27b serve as the catalyst layer, including the OSC material and Pd, susceptible to the phosphorus poisoning. The density of the OSC material supported on the first catalyst downstream layer 27b is set to be higher than the density of the OSC material supported on the second catalyst upstream layer 25a. Thus, the phosphorous poisoning can be suppressed, and the exhaust gas purification performance can be improved.

In some embodiments, the density of Pd supported on the second catalyst upstream layer 25a is set to be higher than Pd supported on the first catalyst downstream layer 27b in FIG. 2. Thus, the first catalyst downstream layer 27b is set to have the high contained density of the OSC material and the low supported density of Pd, whereas the second catalyst upstream layer 25a is set to have the low contained density of the OSC material and the high supported density of Pd.

In this embodiment, the exhaust gas purification performance under the low temperature condition can be improved with the Pd supported density on the second catalyst upstream layer 25a set to be higher than the Pd supported density on the first catalyst downstream layer 27b. A downstream side upper layer that is relatively not susceptible to the phosphorus poisoning includes Pd at a low supported density and the OSC material at a high contained density. Thus, the exhaust gas purification performance (NOx reduction performance in particular) under high load operation and high exhaust gas flowrate condition can be improved.

In some embodiments, in FIG. 2, the second catalyst downstream layer 25b of the second catalyst layer 25 and the first catalyst upstream layer 27a of the first catalyst layer 27 each include Rh as the catalyst component. In such an embodiment, the first catalyst upstream layer 27a and the second catalyst downstream layer 25b support Rh featuring excellent NOx purification activity, whereby the exhaust gas purification performance (NOx reduction performance in particular) can be guaranteed under a high load condition.

In some embodiments, in FIG. 2, the density of Rh supported on the second catalyst downstream layer 25b is the same as the density of Rh supported on the first catalyst upstream layer 27a. Thus, the same Rh slurry can be used to achieve a simpler manufacturing process, and material cost reduction.

In some embodiments, in FIG. 2, a connecting portion 31 is provided which connects the second catalyst downstream layer 25b supporting Rh and the first catalyst upstream layer 27a supporting Rh at the same density, so that the two layers are continuously formed. The connecting portion 31 is formed at a center portion of the supporting substrate 21 as illustrated in FIG. 2. Thus, the connecting portion 31 is formed between the second catalyst upstream layer 25a and the first catalyst downstream layer 27b that each have about ½ of the length of the supporting substrate 21, as shown FIG. 2.

With this configuration, the second catalyst downstream layer 25b and the first catalyst upstream layer 27a with the same Rh supported density can be manufactured with a single slurry coating process, whereby the simpler manufacturing process and the lower material cost can be achieved. In the configuration illustrated in FIG. 2, the slurry coating is performed in the order of (1) 25a, (2) 27a and 25b, and (3) 27b.

In some embodiments, in FIG. 2, the sum of the lengths of the second catalyst upstream layer 25a and the first catalyst downstream layer 27b, each of which include Pd and the OSC material, does not exceed the length of the substrate 21. Specifically, the second catalyst upstream layer 25a and the first catalyst downstream layer 27b are disposed on the upstream end side and the downstream end side of the substrate 21 within the length of the substrate 21 without overlapping each other. Thus, the phosphorous poisoning can be suppressed, and the exhaust gas purification performance can be improved with Pd at the high supported density and the OSC material at the low contained density supported on the second catalyst upstream layer 25a and Pd at the low supported density and the OSC material at the high contained density supported on the first catalyst downstream layer 27b.

The advantageous effects of the Pd at the high supported density and the OSC material at the low contained density supported on the second catalyst upstream layer 25a and Pd at the low supported density and the OSC material at the high contained density supported on the first catalyst downstream layer 27b are summarized as follows. 1) Pd at the high supported density on the second catalyst upstream layer 25a is disposed on the upstream side and thus contributes to improvement in the exhaust gas purification performance at the cold condition, and is disposed on the lower layer and thus contributes to the improvement of the Pd catalyst responsiveness when the phosphorus accumulation proceeds. 2) The OSC material at the low contained density on the second catalyst upstream layer 25a can make the contained density of the OSC material in the first catalyst downstream layer 27b high (when the total amount of the OSC material is fixed). 3) Pd at the low supported density on the first catalyst downstream layer 27b can make the supported density of Pd on the second catalyst upstream layer 25a high (when the total amount of Pd is fixed). 4) The OSC material at the high contained density on the first catalyst downstream layer 27b is on the upper layer and thus is more likely to make contact with the exhaust gas, and is on the downstream side involving less phosphorus accumulation, and thus contributes the improvement of the exhaust gas purification performance (the NOx purification performance in particular) when the phosphorus accumulation proceeds.

In some embodiments, Pd at the high supported density and the OSC material at the low contained density are supported on the second catalyst upstream layer 25a, the Pd at the low supported density and the OSC material at the high contained density are supported on the first catalyst downstream layer 27b, the second catalyst downstream layer 25b and the first catalyst upstream layer 27a each include Rh as the catalyst component. A more preferable setting examples of the supported amount of the second catalyst upstream layer 25a, the second catalyst downstream layer 25b, the first catalyst upstream layer 27a, and the first catalyst downstream layer 27b are as follows. The first catalyst upstream layer 27a: Rh 0.1 to 2.0 g/L. The first catalyst downstream layer 27b: Pd 1.0 to 5.0 g/L and the OSC material 20 to 60 g/L. The second catalyst upstream layer 25a: Pd 3.0 to 10 g/L and the OSC material 5 to 40 g/L. The second catalyst downstream layer 25b: Rh 0.1 to 2.0 g/L. With the values according to the setting example, the phosphorous poisoning can be suppressed, and the exhaust gas purification performance can be improved.

In some embodiments, in FIG. 2, the second catalyst upstream layer 25a has the length that is ½ of the supporting substrate 21. Thus, the effects of Pd at the high density and the OSC material at the low contained density supported on the second catalyst upstream layer 25a can be guaranteed. The length of the second catalyst upstream layer 25a that is ½ of the length of the supporting substrate 21 in FIG. 2 can be set to be 30% to 70% of the length of the substrate 21. When the length of the second catalyst upstream layer 25a is set to be shorter to increase the Pd supported density, an effect of achieving higher exhaust gas purification performance at the low temperature condition can be achieved. When the length of the second catalyst upstream layer 25a is set to fall below 30%, the gas reaction time in the catalyst layer becomes too short to achieve sufficient effect of raising the Pd supported density, and thus exhaust gas purification performance is compromised. When the length of the second catalyst upstream layer 25a exceeds 70%, the settable Pd supported density becomes low, and thus the exhaust gas performance in the low temperature condition is compromised. All things considered, the length of the second catalyst upstream layer 25a is more preferably 30% to 50% of the length of the substrate.

In some embodiments, as illustrated in Example 2 in FIG. 6, a second catalyst upstream layer 35a and a first catalyst downstream layer 37b including Pd and the USC material are uniformly disposed on the upstream end side and the downstream end side of the supporting substrate 21 and have the same length. In the embodiment illustrated in FIG. 2, the second catalyst upstream layer 25a and the first catalyst downstream layer 27b can have the same length with the center of the connecting portion 31 disposed at the center of the supporting substrate 21.

In such an embodiment, the second catalyst upstream layer 35a and the first catalyst downstream layer 37b are formed on the upstream end side and the downstream end side of the supporting substrate 21. Thus, the effect of improving the exhaust gas purification performance and suppressing the phosphorus poisoning with Pd at the high density and the OSC material at the low supported density supported on the second catalyst upstream layer 35a under the cold condition can be achieved. Furthermore, the effect of improving the exhaust gas purification performance (the NOx reduction performance in particular) and suppressing the phosphorous poisoning with the Pd at the low supported density and the OSC material at the high supported density supported on the first catalyst downstream layer 37b can be obtained. The length of a catalyst layer 35 that is ½ of the length of the supporting substrate in Example 2 in FIG. 6 can be set to be 30% to 50% of a length of the substrate. When the length of the catalyst layer 35 is set to be shorter to raise the Pd supported density, an effect of achieving higher exhaust gas purification performance at the low temperature condition can be achieved.

The exhaust gas purification catalyst 11 is further described with reference to an example illustrated in FIG. 6. The amount of NOx, CO, and HC in discharged exhaust gas and a purification performance were evaluated under conditions of predetermined test operation pattern, a predetermined period of time after the cold start, and a high load operation, for samples with the same total amount of precious metal including Pd (including the OSC material) and Rh.

In Comparative Example 1, Pd (including the OSC material) on a second catalyst layer 125 and Rh on a first catalyst layer 127 are each uniformly supported on the corresponding catalyst layer over the entire length of the supporting substrate 21. In Comparative Example 2, Pd (including the OSC material) is divided in two to be on a second catalyst upstream layer 135a and a second catalyst downstream layer 135b of a second catalyst layer 135 at the point of ½ of the length of the supporting substrate 21.

Example 1 corresponds to the embodiment illustrated in FIG. 2, the second catalyst upstream layer 25a covers a range up to ½ of the length of the supporting substrate 21 with the connecting portion 31 disposed on the downstream side and the first catalyst downstream layer 27b disposed further on the downstream side. The first catalyst downstream layer 27b has the length that is almost ½ of the supporting substrate 21, while having the thickness of the connecting portion 31, and the length is substantially the same as the length of the second catalyst upstream layer 25a.

In Example 2, the second catalyst upstream layer 35a and the first catalyst upstream layer 37a have the same length that is ½ of the length of the supporting substrate 21. The second catalyst downstream layer 35b and the first catalyst downstream layer 37b have the same length that is ½ of the length of the supporting substrate 21. The supported density of Pd and Rh on each of Comparative Example 1, Comparative Example 2, Example 1, and Example 2 is written below a corresponding one of schematic views illustrated in FIG. 7, for each segmented zone (each zone).

Figure 7:
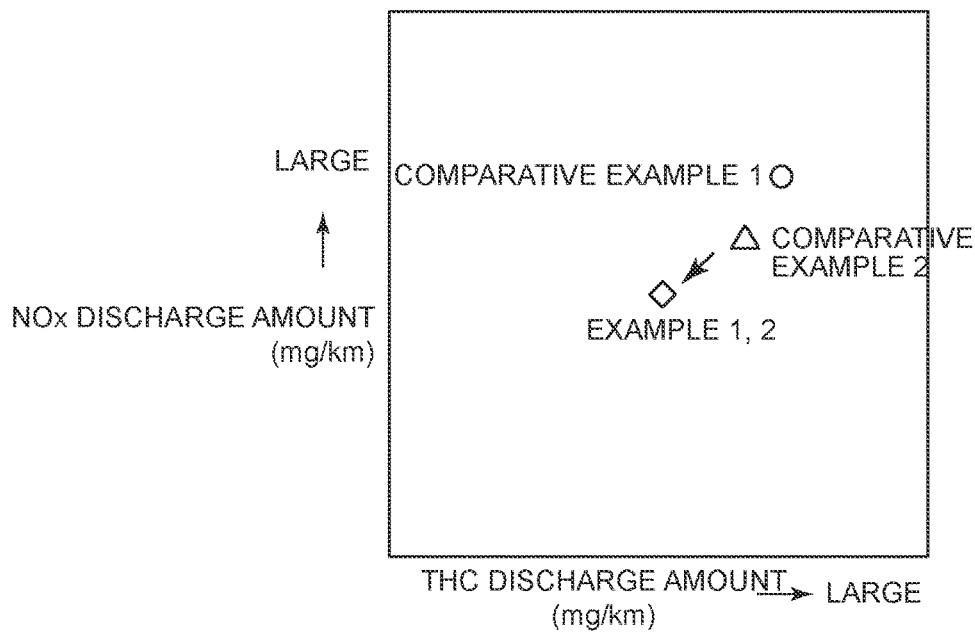
FIG. 7 illustrates a comparison between Comparative Examples 1 and 2 and Examples 1 and 2 in HC and NOx discharge amounts in the condition of internal combustion engine cold start.
Figure 8:
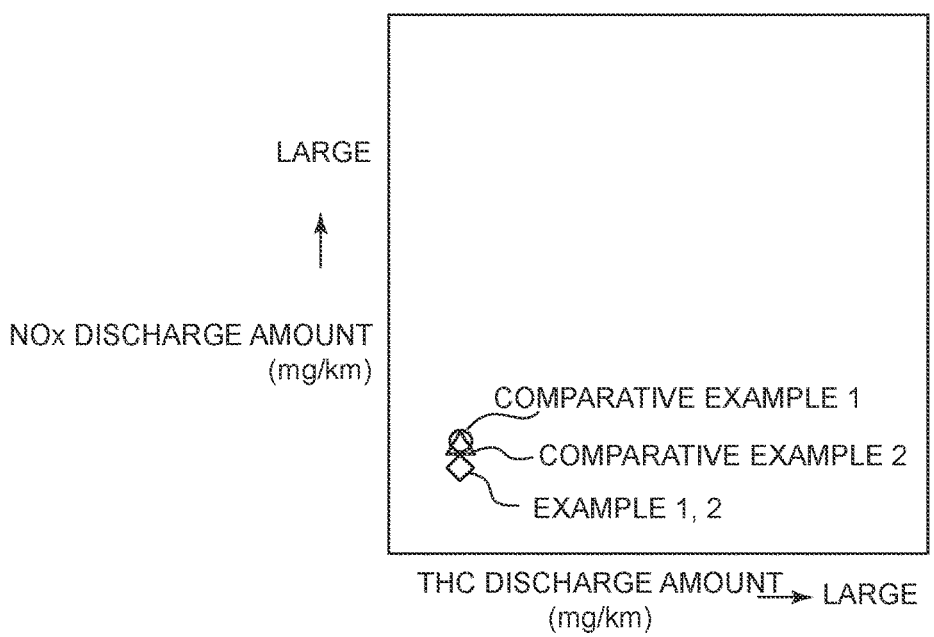
FIG. 8 is a diagram illustrating a comparison in HC and NOx discharge amounts among Comparative Examples 1 and 2 and Examples 1 and 2, in the internal combustion engine high load condition.
Figure 9:
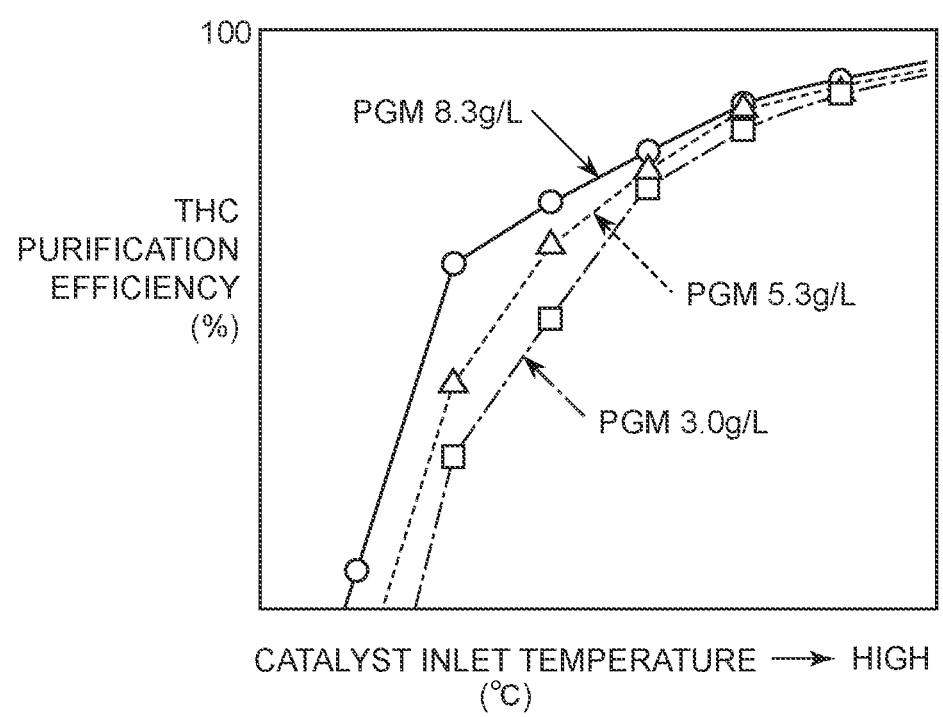
FIG. 9 is a characteristic graph illustrating temperature characteristics of catalyst activity.

FIGS. 7 and 8 illustrate results of an exhaust gas purification performance test. FIG. 7 illustrates a comparison among Comparative Examples 1 and 2 and Examples 1 and 2 in the discharged amounts of HC and NOx at the point of engine cold start. FIG. 8 illustrates a comparison among Comparative Examples 1 and 2 and Examples 1 and 2 in the discharged amounts of HC and NOx under the engine high load condition. Examples 1 and 2 correspond to results with substantially the same exhaust gas amount. It can be seen in FIGS. 7 and 8 that Examples 1 and 2 provide a higher effect of improving the exhaust gas purification performance after the cold start and maintaining high exhaust gas purification performance during the high load operation, compared with Comparative Example 1.

The catalyst layer supporting Pd (including the OSC material) is disposed to have an upstream portion and a downstream portion respectively disposed below and above the catalyst layer supporting Rh, that is, respectively provided as the second catalyst upstream layer 25a and the first catalyst downstream layer 27b. Thus, it has been confirmed that the degradation of the performance due to the poisoning by phosphorus derived from engine oil can be suppressed, and the harmful gas discharged from the engine cold start to the high load operation can be effectively purified.

The invention claimed is:

1. An exhaust gas purification catalyst for an internal combustion engine, the exhaust gas purification catalyst being disposed in an exhaust gas passage of the engine and comprising:
   a substrate;
   a catalyst layer formed on a surface of the substrate; and
   a catalyst component supported on the catalyst layer,
   wherein the catalyst layer comprises:
      a first catalyst layer exposed to an exhaust gas flow; and
      a second catalyst layer formed between the first catalyst layer and the substrate,
   wherein a second catalyst upstream layer formed on an upstream side of the second catalyst layer with respect to the exhaust gas flow includes at least one precious metal of palladium and platinum, as well as an oxygen storage material as the catalyst component,
   wherein a first catalyst downstream layer formed on a downstream side of the first catalyst layer with respect to the exhaust gas flow includes the at least one precious metal of the palladium and the platinum, as well as the oxygen storage material as the catalyst component,
   wherein an amount of the oxygen storage material in the first catalyst downstream layer is larger than an amount of the oxygen storage material in the second catalyst upstream layer,
   wherein a density of the at least one precious metal of the palladium and the platinum supported on the second catalyst upstream layer is higher than a density of the at least one precious metal of the palladium and the platinum supported on the first catalyst downstream layer, and
   wherein the exhaust gas purification catalyst further comprising a connecting portion that connects a second catalyst downstream layer formed on a downstream side of the second catalyst layer and a first catalyst upstream layer formed on an upstream side of the first catalyst layer.

2. The exhaust gas purification catalyst for an internal combustion engine according to claim 1, wherein the second catalyst downstream layer includes rhodium as the catalyst component, and the first catalyst upstream layer includes rhodium as the catalyst component.

3. The exhaust gas purification catalyst for an internal combustion engine according to claim 2, wherein a density of the rhodium supported on the second catalyst downstream layer is same as a density of rhodium supported on the first catalyst upstream layer.

4. The exhaust gas purification catalyst for an internal combustion engine according to claim 1, wherein a sum of lengths of the second catalyst upstream layer and the first catalyst downstream layer does not exceed a length of the substrate.

5. The exhaust gas purification catalyst for an internal combustion engine according to claim 2, wherein a sum of lengths of the second catalyst upstream layer and the first catalyst downstream layer does not exceed a length of the substrate.

6. The exhaust gas purification catalyst for an internal combustion engine according to claim 1, wherein a length of the second catalyst upstream layer is 30% to 70% of a length of the substrate.

7. The exhaust gas purification catalyst for an internal combustion engine according to claim 2, wherein a length of the second catalyst upstream layer is 30% to 70% of a length of the substrate.

\* \* \* \* \*